United States Patent [19]
Smith et al.

[11] 3,890,021
[45] June 17, 1975

[54] BEARING LUBRICATION SYSTEM

[75] Inventors: Robert E. Smith; Leroy C. Carter, both of Lima, Ohio

[73] Assignee: Westinghouse Electric Corporation, Pittsburgh, Pa.

[22] Filed: Feb. 19, 1974

[21] Appl. No.: 443,886

[52] U.S. Cl.............................. 308/126; 308/187.1
[51] Int. Cl. .......................................... H01h 35/00
[58] Field of Search........ 308/88 R, 88 A, 111, 112, 308/121, 125, 126, 187, 187.1

[56] References Cited
UNITED STATES PATENTS
| | | | |
|---|---|---|---|
| 894,634 | 7/1908 | Hardinge | 308/126 |
| 1,416,884 | 5/1922 | Schmidt | 308/126 |
| 1,977,959 | 10/1934 | Watts | 308/126 |

Primary Examiner—M. Henson Wood, Jr.
Assistant Examiner—Richard A. Bertsch
Attorney, Agent, or Firm—G. H. Telfer

[57] ABSTRACT

A lubrication system is provided for oil lubricated bearings in which oil is supplied from a reservoir by means of a wick which is in contact with the shaft but is held in place only by its engagement with a spring-pressed holder. The holder engages the shaft and is held in position by a support with which it has only line contact to minimize friction. The system is sealed by seals which consist of a self-centering clearance disc having an extremely small clearance with the shaft to minimize leakage but with no rubbing contact with the shaft.

8 Claims, 2 Drawing Figures

BEARING LUBRICATION SYSTEM

BACKGROUND OF THE INVENTION

The present invention relates to the lubrication of bearings for rotating shafts, and more particularly to an improved sealed, self-contained system for oil lubrication.

Bearings are usually lubricated by either grease or oil and adequate lubrication must, of course, be maintained at all times. Grease lubricated bearings must be periodically replaced or the grease must be replenished at intervals, and for many applications grease lubrication cannot be used at all because of temperature conditions, or requirements for long life or minimum maintenance. When oil lubrication is used, the bearing may be flooded with oil, or oil mist or spray lubrication may be used. Oil mist lubrication is usually achieved by supplying oil from a reservoir by means of a wick rubbing on the shaft, although pumping sources or jets may be used. In oil lubricated bearings, sealing means must be provided to prevent the loss of oil from the bearing and this has been accomplished by the use of various types of seals including rubbing contact seals and labyrinth seals.

In some applications of oil lubricated bearings, the requirements that must be met have become increasingly difficult. Thus, in electrical generators used in aircraft, self-contained bearing systems are required having a minimum life of 10,000 hours without removal of the generator from the aircraft, and with servicing at intervals of not less than 1000 hours. These are high speed generators, operating at speeds of 8000 revolutions per minute, and the cooling air available may have temperatures approaching 100°C which can result in continuous bearing temperatures in the range of 170°C. The temperature and speed conditions and the life requirements prevent the use of grease lubrication and require oil lubrication. The weight requirements for such generators, together with the servicing and life requirements, make it necessary to use relatively small oil reservoirs but with extremely good sealing means to prevent substantial loss of oil.

Heretofore, flooded bearings have been used for this type of service with rubbing friction seals to control oil leakage. Flooded bearings with rubbing seals, however, have numerous disadvantages. The seal friction losses at the high shaft speed can generate sufficient heat to limit the load capacity of the generator due to deterioration of the oil at high temperature, while failure of the seal results in loss of the oil with resultant failure of the bearing and total loss of the generator itself. The turbulence of the oil also results in further undesirable losses and heating, and complex pressure relief valves are necessary to accommodate changes in altitude and temperature which cause changes in the oil pressure. Wick lubrication has not heretofore been used for this type of service because no means has been known to obtain adequate wick life with a wick rubbing on the shaft at high speeds and high temperatures, which cause rapid wear of the wick. Furthermore, previous wick designs had a tendency to cause the wicking to stick in the holder with resulting loss of contact with the shaft, so that oil transfer to the shaft is interrupted and the bearing loses lubrication.

SUMMARY OF THE INVENTION

The present invention provides a sealed, self-contained bearing lubrication system utilizing non-rubbing seals and wick lubrication which is capable of meeting the difficult requirements and severe conditions of operation discussed above.

In accordance with the invention, a wick lubricated system is provided in which the wick is contained in a tube or holder of low friction material which is held against the shaft by spring pressure. The wick itself, however, is held in contact with the shaft only by its engagement with the holder and is free of any pressure, so that it has minimum force against the shaft and wear of the wick is reduced to a very small amount with correspondingly long life. The wick holder is positioned by a support member which has essentially only line contact with the holder, so that friction between the wick holder and the support member is minimized to substantially eliminate the possibility of the wick holder sticking in the support. Effective sealing is provided by the use of clearance seals which include a clearance disc mounted so as to be capable of radial movement to center itself with respect to the shaft with an extremely small clearance with the shaft, so that leakage of oil through the seal is kept to a minimum.

BRIEF DESCRIPTION OF THE DRAWINGS

The invention will be more fully understood from the following detailed description, taken in connection with the accompanying drawing, in which.

BRIEF DESCRIPTION OF THE PREFERRED EMBODIMENT

Figure 1:
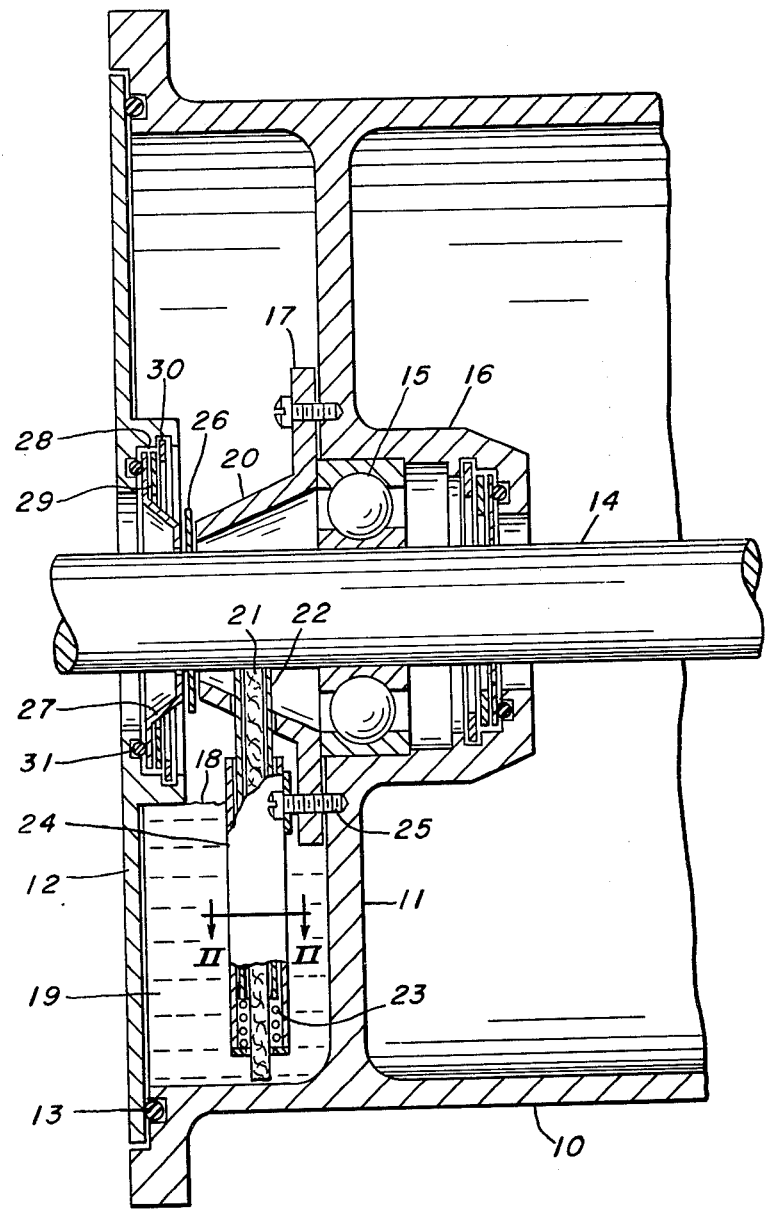
FIG. 1 is a longitudinal sectional view of a bearing lubrication system embodying the invention.

The invention is shown in the drawing embodied in an oil lubricated bearing for use in an aircraft generator, although its usefulness is obviously not limited to this particular application. There is shown in FIG. 1 one end of a generator of typical construction having a frame 10 with an end bracket portion 11 which may be integral with the frame. The end of the frame is closed by a plate 12 which is attached to the frame in any suitable manner and sealed by suitable sealing means such as O-rings 13. The shaft 14 of the generator is supported in the end bracket 11 by means of a ball bearing 15 having its inner race pressed or otherwise secured on the shaft and its outer race mounted in any suitable manner in a bearing holder portion 16 of the end bracket 11. A lock cap 17 may be provided for retaining the outer bearing race in position in the bearing holder 16.

The bearing 15 is lubricated by oil supplied to the shaft 14 from which it is thrown off in the form of a mist and carried into the bearing 15 to lubricate it. The oil 18 is contained in a reservoir 19 formed by the space between the closure plate 12 and end bracket 11, although the oil reservoir 19 may be formed in any desired manner. The reservoir 19 is disposed below the shaft 14 and in such a position that the level of the oil in the reservoir is well below any possible leakage paths in the area of the seal to be described later. Oil 18 is supplied from the reservoir 19 to the shaft 14 and is thrown off the shaft in the form of mist particles. A generally conical mist deflector 20 is provided, which may be made integral with the bearing lock cap 17 if desired, and which encircles the shaft to deflect the oil mist into the bearing 15. The diameter of the deflector 20 adjacent the bearing 15 is made approximately equal to, or slightly less than, the inner diameter of the outer bearing race so that oil running down the inside surface of the deflector will flow directly into the bearing. The oil then drains from the bearing back to the reservoir.

Figure 2:
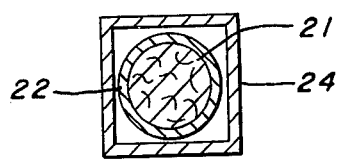
FIG. 2 is a sectional view substantially on the line II—II of FIG. 1.

Oil 18 is conveyed from oil reservoir to the shaft by means of a wicking system. This includes a felt wick 21 which may be of any usual type capable of conveying oil by capillary action from the reservoir to the shaft. The wick 21 is supported in contact with the shaft by means of a wick holder 22. The holder 22 is preferably an elongated tube, as shown, and is made of a low friction material such as graphite-filled Teflon (polytetrafluoroethylene) or Teflon-filled polyimide. The wick 21 is contained in the tube 22 and extends downward from the shaft with its lower end exposed to the oil in the reservoir 19. The wick holder 22 is held against the shaft 14 by resilient means such as a spring 23 engaging the lower end of the holder and bearing against a fixed support member 24. It is to be noted, however, that the wick 21 is free of the spring 23 and is held against the shaft only by its engagement with the tube 22. The wick holder tube 22 is held in place by the support member 24 which is shown as being an elongated member mounted in position by a bolt 25 which may be one of the bolts which mounts the bearing lock cap 17 in place. The support 24 may be made of any suitable material such as sheet metal and the tube 22 and support 24 are designed so as to have substantially only line contact between them in order to minimize friction. Preferably, as shown in FIG. 2, the tube 22 is of circular cross section and the support 24 is of square cross section so that the tube is in contact with the support at only four positions and with essentially only line contact.

In the usual arrangement of wick lubricated bearings, the wick is held against the shaft by spring pressure, or other means, with considerable force and the wear rate due to fibers pulling off the wick is quite high. In accordance with the present invention, in order to reduce the wear rate so as to obtain the required long life, the wick is not forced against the shaft but is merely in contact with it. The wick holder 22 holds the wick in place against the shaft solely by the frictional engagement between the wick and the holder, with sufficient contact for continuous supply of oil to the shaft from the reservoir 19. The holder itself is held against the shaft by the spring 23 and wears off due to friction against the shaft, although a low friction material is preferably used to reduce the wear rate and to minimize the friction loss and heating. The wick itself, however, merely maintains contact with the shaft and is not pressed against it by the holder 22 so that the wear rate of the wick is extremely low and the required long life is obtained. The mounting of the wick holder 22 in its support 24 is also an important feature since it eliminates the problem of sticking sometimes encountered in conventional arrangements, especially under conditions of deteriorated oil which causes sticky varnish deposits. The line contacts of the wick holder tube with its support effectively minimize the frictional engagement and substantially eliminate any possibility of sticking of the tube 22.

As previously indicated, a lubricating system of the type disclosed requires a very effective sealing means to prevent substantial loss of oil. This is especially important in the case of aircraft generator bearings. These generators are typically cooled by air bled from the jet engine of the aircraft and a very high pressure exists across the seals, especially under certain conditions such as during takeoff. This high pressure difference between the high pressure cooling air within the generator and the ambient air pressure outside tends to drive the oil mist from the shaft through the seal. The loss of oil in this way through a conventional clearance seal would be very substantial and the oil would be depleted at a much faster rate than could be tolerated. Conventional rubbing seals are not suitable, however, because of the high shaft speed which would cause excessive heating and rapid wear.

In accordance with the invention an improved clearance seal is provided. A centrifuge disc or oil flinger 26 is mounted on the shaft between the seal itself and the mist deflector 20 to catch and throw off oil and oil mist tending to flow toward the seal. Oil mist particle concentration at the seal clearance gap is thus reduced. There will still be air flow through the seal but the oil mist density in the air will be minimized. The disc 26 may be of any suitable configuration and should be placed as close as possible to the mist deflector 20 but with sufficient clearance to avoid any risk of contact.

The seal itself must have as small a clearance with the shaft as possible, preferably in the range of 0.02 inch on each side. Such a small clearance cannot readily be maintained with normal manufacturing tolerances or concentricity of the various parts involved. In accordance with the present invention, this extremely low clearance is obtained by means of a self-centering seal disc 27 which can adjust itself to maintain clearance. The seal disc 27 is a solid stationary disc which may be made of metal or any suitable material. The disc has a central opening of a size to have an extremely small clearance with the shaft such as in the size range mentioned above. The disc 27 is held in an annular recess 28 in the closure plate 12 which provides sufficient radial clearance to allow the disc 27 to move radially to adjust its position. The disc is retained in position by a backup washer 29 engaging the disc and held in place by a snap ring 30. The disc 27 is sealed against the plate 12 by means of an O-ring 31 which is of such size that it is sufficiently compressed in assembly to form a seal but will permit radial movement of the plate 27. A similar seal is provided at the inner side of the bearing to prevent loss of oil to the interior of the generator but the centrifuge disc 26 may not be necessary at the inner side, and can be omitted, since the pressure difference across the bearing is in the direction to drive the oil mist back into the bearing.

An alternative means for obtaining an even smaller seal clearance would be to manufacture the seal disc 27 from a material such as graphite-filled Teflon with an initial central opening slightly smaller than the shaft so as to have a slight interference fit with the shaft in the original assembly. The disc would then run in in a short time to a condition of minimum clearance with the shaft.

It should now be apparent that a new lubrication system has been provided which satisfies the requirements previously discussed. Thus, the oil is fed from the reservoir by means of a wick but the wick is supported in such a manner as to have contact with the shaft with such an extremely low force that the wear of the wick is reduced to a minimum and the life is greatly increased over previous arrangements. The wick mounting also provides for low friction between the wick holder and the shaft, and for minimizing the risk of sticking of the wick holder. Very effective sealing means are provided to prevent any substantial loss of oil so that there is no serious depletion of the amount of oil in the system and the required time between maintenance operations can easily be met. A bearing lubrication system is thus provided which is highly effective for the type of service referred to above, or for any application where oil lubrication is required and severe conditions of operation are encountered.

What is claimed is:

1. In combination, a rotatable shaft, bearing means for supporting said shaft, an oil reservoir below the shaft containing lubricating oil, a wick in contact with the oil, wick holder means engaging the shaft and holding the wick in position to make contact with the shaft, and resilient means urging the wick holder means against the shaft, the wick being free of said resilient means.

2. The combination defined in claim 1 in which the wick holder means comprises a tube of low friction material, and the wick is contained in said tube with one end in contact with the shaft and the other end extending into contact with the oil.

3. The combination defined in claim 2 and including a support for said tube, the tube having essentially only line contact with the support.

4. The combination defined in claim 3 in which said tube is of circular cross section and the support is an elongated member of square cross section enclosing the tube.

5. The combination defined in claim 1 and including sealing means on at least one side of the bearing means.

6. The combination defined in claim 5 in which said sealing means includes a self-centering disc encircling the shaft with a very small clearance.

7. The combination defined in claim 6 and including a support for said disc, said support encircling the shaft and providing clearance around the outer periphery of the disc such that the disc can move radially to center itself on the shaft, and sealing means between the disc and the support.

8. The combination defined in claim 6 and including means on the shaft between said disc and the bearing means for throwing off oil tending to flow toward the disc.

* * * * *